April 26, 1966 D. R. ANDREWS 3,248,066

MAGNETIC RECORDING AND REPRODUCING APPARATUS

Filed Oct. 26, 1960 3 Sheets-Sheet 1

INVENTOR.
Dallas R. Andrews
BY Morris L. Rabkin
Attorney

MAGNETIC RECORDING AND REPRODUCING APPARATUS

INVENTOR.
Dallas R. Andrews
BY Morris Rabkin
Attorney

MAGNETIC RECORDING AND REPRODUCING APPARATUS

Filed Oct. 26, 1960 3 Sheets-Sheet 3

INVENTOR.
Dallas R. Andrews
BY
Attorney

United States Patent Office 3,248,066

Patented Apr. 26, 1966

3,248,066

MAGNETIC RECORDING AND REPRODUCING APPARATUS

Dallas R. Andrews, Merchantville, N.J., assignor to Radio Corporation of America, a corporation of Delaware Filed Oct. 26, 1960, Ser. No. 65,028
21 Claims. (Cl. 242—55.12)

The present invention relates to magnetic recording and reproducing apparatus, and more particularly to apparatus for transporting a reelable magnetic record.

The invention is especially suitable for providing a tape transport mechanism. The features of the invention will, however, also be useful generally in providing apparatus for handling reelable mediums such as films, tape and the like.

A practical tape transport mechanism should be capable of driving a tape record at relatively slow speed past a magnetic head so as to permit the head to record and reproduce signals on the record. The tape transport mechanism should also be adapted to move the tape between the reeling devices on which the tape is stored at a rapid speed to facilitate rapid rewinding thereof. Convenience and ease of operation of the transport mechanism are also important. It is desirable that reeling operations be stopped automatically before the tape is completely withdrawn from a reeling device in order to eliminate the need for rethreading the tape.

It is an object of the present invention to provide an improved apparatus for transporting a magnetic record tape and which is capable of performing all needed tape handling functions and is simple and convenient to operate.

It is a further object of the present invention to provide an improved tape transport mechanism which requires fewer parts and can be constructed at lower cost than known tape transport mechanisms capable of the same operating functions.

It is a still further object of the present invention to provide an improved mechanism for reeling tape, film and other reelable mediums.

It is a still further object of the present invention to provide an improved control mechanism for a tape transport which is simple in its construction and which requires only a single control for selecting various reeling operations.

It is a still further object of the present invention to provide an improved mechanism for preventing accidental erasure of a magnetic record.

It is a still further object of the present invention to provide an improved clutch mechanism suitable for use in a tape transport.

It is a still further object of the present invention to provide an improved mechanism for changing the speed at which a reelable member is driven in tape transport.

It is a still further object of the present invention to an improved belt drive system by means of which speed variations in a driven member are minimized.

Briefly described, according to one feature of the present invention, there is provided an apparatus for reeling a reelable medium, such as a magnetic record tape, between a pair of reeling devices. A drive belt is arranged for normally driving one of a pair of reeling devices to take up the tape supplied by the other of the pair of reeling devices. A mechanism is provided for disengaging the belt from driving relationship with the normally driven one of the pair of reeling devices and engaging the belt with the other of the pair of reeling devices. In this manner, the reeling devices may be rotated so as to reel the tape therebetween in opposite directions and also at high speed.

A slow speed driving mechanism is provided for driving the tape when it is disposed in driving relationship therewith. This slow speed mechanism may, for example, include a capstan which is driven by the same belt which drives the normally driven one of the pair of reeling devices. The capstan cooperates with a pressure roller to engage the tape.

A control mechanism is provided, in accordance with another feature of this invention, including a control shaft which is rotatable by a single manually actuable control. A pair of control arms is included in the control mechanism. One of these control arms is associated with the slow speed drive mechanism and the other control arm is associated with the mechanism for engaging and disengaging the belt with different ones of the pair of reeling devices. A double action detent mechanism couples the arms and the control shaft to each other. When the control shaft is rotated in one direction, the arm associated with the slow speed mechanism moves the slow speed drive mechanism into driving relationship with the tape and sets the detent mechansim. The slow speed drive mechanism is retained in driving relationship by one action of the detent mechanism. When the control shaft is rotated in the opposite direction, the arm which causes engagement and disengagement of the belt is actuated to disengage the belt with one of the reeling devices and to engage the belt with the other of the reeling devices. The detent mechanism is again set and maintains the engagement of the belt with the other reeling device. In this manner, the tape may be driven at slow speed to permit recording thereon or reproduction therefrom. Alternatively, the tape may be reeled at high speed for rewinding.

Tape tension responsive devices are coupled to the detent mechanism. When the end of the tape which is wound on either of the reeling devices is approached, the tension in the tape increases. The tension responsive device senses such increased tension and trips the detent mechanism. Means are provided for stopping reeling operations at either slow or high speed when the detent mechanism is tripped.

A tape transport apparatus may be provided in accordance with still another feature of the invention with an interlock mechanism including a bar which interlocks with a control for electronic apparatus which operates to apply erase energy to the magnetic heads on the tape transport. An arm is coupled to the control mechanism for moving the interlock bar when the detent mechanism included in the control mechanism is tripped. The control for the electric equipment must be advertently operated in order to permit the magnetic record to be erased. Inadvertent erasure is, therefore, precluded.

A clutch mechanism, which is provided in accordance with still another feature of the invention, is useful for coupling the one of the reeling devices which is adapted to take up the tape driven by the slow speed driving mechanism to the driving belt. This clutch mechanism includes a clutch plate. A flat spring attached to a shaft which rotates the reeling device biases the clutch plate against a wheel which is engaged by the drive belt. Accordingly, the bias provided by the flat spring controls the amount of torque which may be transferred from the belt to the reeling device.

A speed change mechanism may be provided in the tape transport mechanism in accordance with still another feature of the invention. This speed change mechanism includes a drive pulley which has portions of different diameters. The drive belt is driven by this drive pulley. A control member is provided for selectively engaging the belt on different sides thereof. When the belt is engaged by the control member while it is in motion, it moves between the portions of different diameter of the pulley depending upon which side of the belt is contacted by the control member.

The belt drive system provided in accordance with still another feature of the invention includes a belt of resilient material having an annular cross-section. The belt is entrained around a drive member (e.g., the motor pulley) and a driven member (e.g., the capstan flywheel). The drive member has a flat drive surface provided with a groove smaller in width than the diameter of the belt. The belt rides in the groove. It can not meander over the surface of the drive member and climb onto portions of the drive member having different diameters than the flat drive surface. The effective diameter of the drive member thus remains constant, as does the speed of the belt.

The invention itself, both as to its organization and method of operation, as well as the foregoing and other objects and advantages thereof, will become more readily apparent from a reading of the following description in connection with the accompanying drawings, in which.

Figure 1:
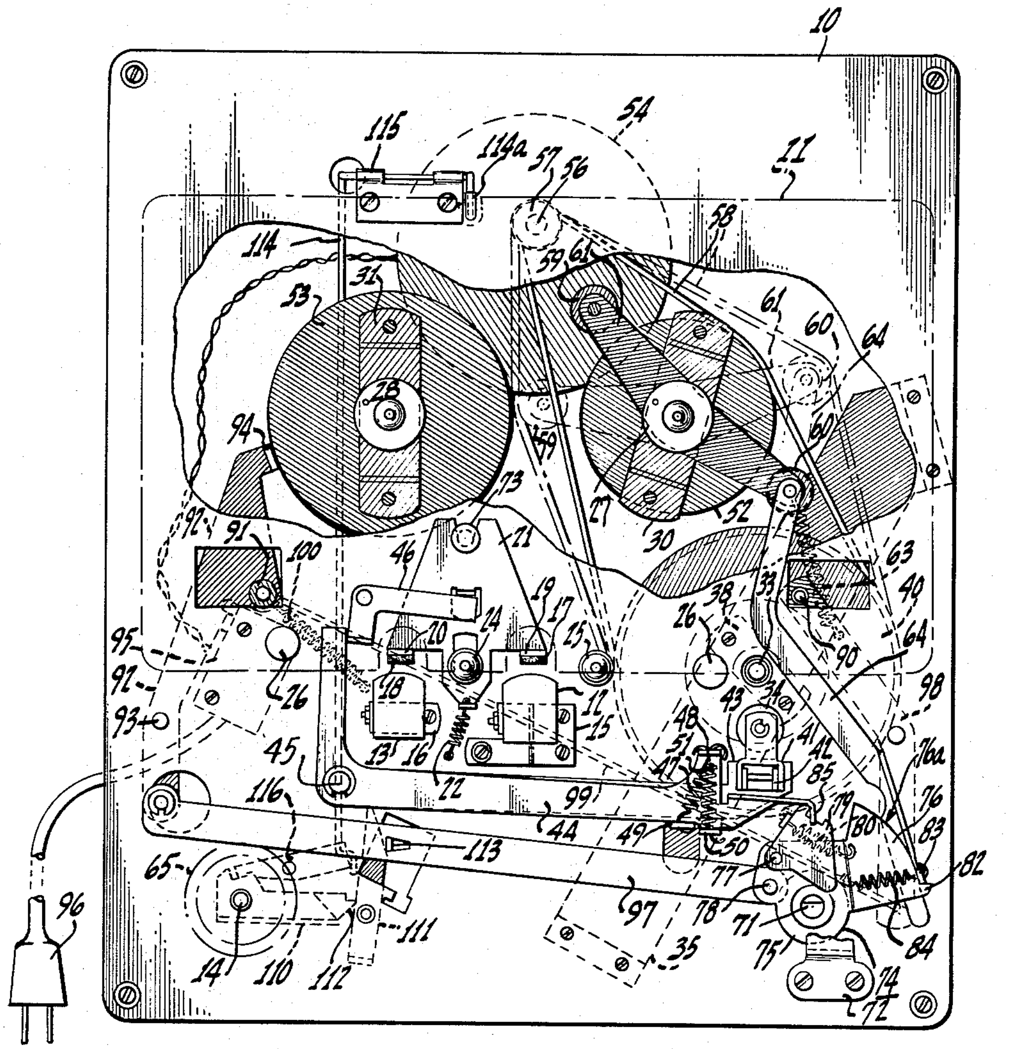
FIGURE 1 is a plan view of a tape transport mechanism in accordance with the invention with certain parts removed, other parts broken away, and certain other parts hatched to indicate vertical displacement thereof relative to each other and to other parts.
Figures 2, 3, 4:
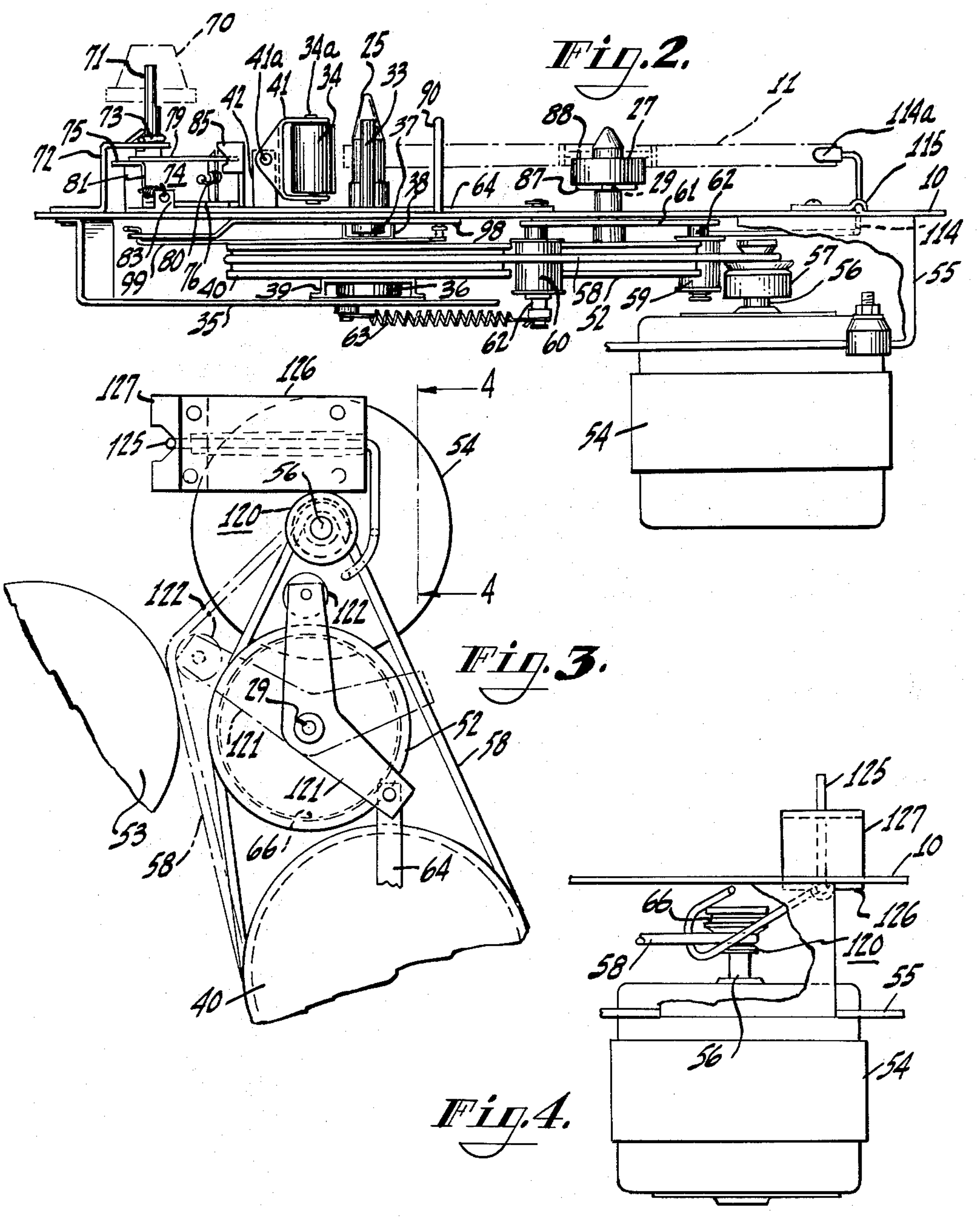
FIGURE 2 is a side view of the tape transport mechanism as seen from the right in FIG. 1.
FIGURE 3 is a fragmentary, plan view showing the speed change mechanism in accordance with the invention and another embodiment of a reeling mechanism also in accordance with the invention.
FIGURE 4 is a fragmentary side view of the mechanism as seen from the right along the line 4—4 of FIG. 3 in the direction of the appended arrows.

Referring to FIGS. 1 and 2 of the drawings, there is shown a tape deck 10 on which a cartridge 11 may be disposed. The cartridge 11 carries the magnetic record tape which is driven by the tape transport mechanism, and is shown in phantom in the drawing. Cartridges of the type illustrated are generally available and may have a plurality of record tracks recorded on the tape therein. These record tracks are adapted to be scanned by magnetic heads 12 and 13. The head 12 is a record-playback head. The head 13 is an erase head. Each of these heads 12 and 13 may have a pair of spaced head units for simultaneously scanning a pair of record tracks. Stereophonic or monaural recording or reproducing is therefore possible.

The magnetic heads 12 and 13 are connected to an amplifier and other electronic apparatus associated with the tape transport. Such apparatus is well known and will not be described in further detail herein. It may be conditioned for recording or reproducing by means of a record-playback switch 65 of the rotary, stacked wafer type. This switch is controlled by a shaft 14 which is mounted on the tape deck 10. The shaft is biased so that the switch is normally in the playback position. The shaft 14 may be rotated in a clockwise direction against this bias to condition the electronic apparatus for recording. During recording operation, the high frequency oscillations are applied to the erase head 13 for the purpose of erasing the signals previously recorded on the tracks of the tape record which are scanned by the head 13. Bias oscillations are also applied to the record-playback head 12 together with audio signals to be recorded on the tape. The operation of the mechanism associated with the shaft 14 will be described in detail hereinafter.

The heads 12 and 13 are mounted on the tape deck 10 by means of brackets 15 and 16. The heads 12 and 13 cooperate with pressure pads 17 and 18, respectively.

These pressure pads are disposed on studs 19 and 20 which project upwardly from a plate 21 which is slidably mounted on the tape deck 10. The tape is pressed against the heads when the slide plate moves in a direction towards the bottom of the drawing as viewed in FIG. 1 under the bias of a spring 22 which is connected between the tape deck 10 and another upwardly projecting stud on the slide plate 21. The slide plate 21 is guided by a lug 23 which projects from the tape deck 10 through a slot in the slide plate 21 and by a tape guide 24 which also projects from the deck 10 through another slot in the slide plate 21. Another tape guide 25 is provided on the opposite side of the head 12.

A pair of cylindrical studs 26 is also secured to the tape deck for the purpose of positioning the cartridge at the proper position above the deck so that the tape will be properly aligned with the heads and guides. The tape cartridge includes a pair of hubs (not shown) around which the tape is wound. These hubs are carried on turntables 27 and 28. The turntables 27 and 28 are mounted on shafts 29 which are journaled in the tape deck. The journals (not shown) are supported by brackets 30 and 31.

Flat spiral springs 87 (FIG. 2) are disposed around the shafts 29 immediately below the turntables 27 and 28. The shafts are undercut. The inner diameter of each spring 87 is smaller than the diameter of the shafts 29 so that the springs snap into place in the undercut portions of the shafts 29. The free ends 88 of the springs 87 extend through holes in the turntables 27 and 28 and provide keys for rotatably coupling the hubs in the cartridge to the turntables.

The tape is driven at slow speeds for recording and playback by a slow speed drive mechanism including a capstan 33 which cooperates with a pressure roller 34. The capstan 33 is formed by the end of the capstan shaft. This capstan shaft is supported by a U-shaped bracket 35 which is secured to the tape deck 10 and is rotatably mounted in journals 36 and 37. The journal 36 is secured to the bracket 35 by another bracket 39. The apper journal 37 is carried by a deck supported bracket 38. A pulley-like capstan flywheel 40 is secured on the capstan shaft 33.

The pressure roller 34 is carried by a vertical pin **34*a* which is rotatably mounted on a U-shaped bracket 41 and which is parallel to the axis of the capstan 33. The bracket 41 is pivotally mounted on a horizontal pin 41*a* carried by lugs 42 which extend from an arm 43. This arm 43 and another arm 44 provide a pressure roller assembly. Both pressure roller arms 43 and 44 are secured to the tape deck 10 at a pivot 45. The arm 44 is L-shaped and is disposed in contact with another L-shaped arm 46 at the end thereof. The arm 46 controls the movement of the pressure pad slide plate 21. Accordingly, when the pressure roller 34 is spaced from the capstan 33, as shown in FIG. 1, the pressure roller arm 44 positions the arm 46 to hold the pressure pad slide plate 21 in a position such that the pressure pads 17 and 18 are spaced away from the heads 12 and 13. When the pressure roller 34 and the pressure pads 19 and 20 are in the positions shown in the drawings, the cartridge 11** may be placed on the deck and the tape may enter between the pressure pads and heads and between the capstan and pressure roller. The pressure pads and pressure roller are in the position shown in FIG. 1 of the drawings also during rewind operation so as not to impede the rapid movement of the tape.

The arm 44 is biased in a direction away from the capstan by a spring 47. The spring 47 is attached at one end to an upstanding projection 48 on the arm 44 and at the other end to a stud 49 which extends from the tape deck 10. Since the edge of the arm 44 engages an upstanding projection 50 on the arm 43 which carries the pressure roller 34, the pressure roller will also move under the bias of the spring 47 to the position shown in FIG. 1. The stud 49 acts as a stop for both arms 43 and 44. A spring 51 between the projections 48 and 50 on the arms 44 and 43 yieldably couples these arms together. Accordingly, when the arm 44 is moved upwardly, as viewed in FIG. 1, by the control mechanism, the pressure roller 34 will be yieldably urged against the capstan 33. Since the pressure roller 34 is pivotally mounted for rotation about a pair of axes one of which is perpendicular and the other parallel to the axis of the capstan, the pressure roller aligns itself with respect to the capstan.

The drive mechanism of the tape transport also comprises a pair of reeling devices which include a pair of drive wheels 52 and 53 coupled to the turntable shafts 29. The drive wheel 52 is coupled to its turntable shaft by way of a clutch mechanism which will be described in detail hereinafter in connection with FIG. 6 of the drawings.

A motor 54 which supplies the driving power for the tape transport is mounted below the tape deck 10 by means of a motor bracket 55. This motor has a shaft 56 to which a pulley 57 is attached, as by a set screw. A belt 58 is trained around the pulley 57 and the capstan flywheel 40. This belt is an O ring of compliant material, such as rubber. A portion of the belt between the capstan flywheel 40 and the pulley 57 is disposed in driving engagement with the wheel 52. The pulley 57 and drive wheel 52 each has a groove 66 therein. The groove is narrower than the diameter of the belt 58 and serves to guide the belt. The motor 54 rotates the pulley in a counter-clockwise direction as shown in FIG. 1. Accordingly, the belt 58, the capstan flywheel 40 and the wheel 52 all rotate in a counter-clockwise direction. The capstan 33 similarly rotates in a counter-clockwise direction. Accordingly, when the tape is pinched against the capstan by the pressure roller 34, the tape will be driven from the left to right, as viewed in FIG. 1. The turntable 27 is driven in a counter-clockwise direction by the wheel 52 to take up the tape. Thus, the wheel 52 is the take-up wheel and the turntable 27 is the take-up turntable. The wheel 53 is the supply wheel and the turntable 28 is the supply turntable.

The tape will be reeled faster by the turntable 27 than it is driven by the capstan 33. Accordingly, the clutch (to be described in greater detail hereinafter) which couples the turntable 27 to the wheel 52 through the shaft 29 will slip. Alternatively, the clutch mechanism may be eliminated. Slippage will then occur between the belt 58 and the wheel 52 where the wheel 52 contacts the belt 58.

The belt drive system including the grooved motor pulley 57 and drive wheel 52 is provided in accordance with a feature of this invention. Known belt drive systems use either pulleys having V-shaped grooves or flanged pulleys. Speed variations are produced in these known systems since the radial distance between the belt and the center of the pulley varies. For example, in V-groove pulleys, vibrations such as those due to the motor cause the belt to climb the wall of the groove. This effectively increases the diameter of the pulley. A belt of round cross-section can also meander across the surface of a flanged pulley and climb the side of the flange. This also changes the effective diameter of the pulley.

In drive systems of the type used in tape transports wherein the ratio of the diameters of the drive or motor pulley and the driven or capstan flywheel pulley is great, even small variations in the effective diameter of the smaller motor pulley cause relatively large capstan speed variations. Such capstan speed variations are manifested as wow and flutter in the recording and playback process.

Figure 5:
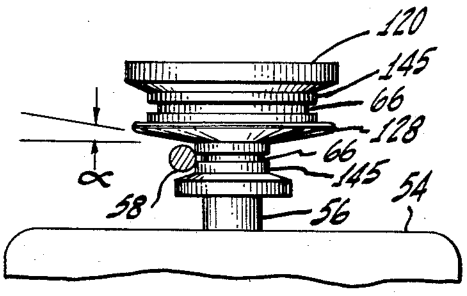
FIGURE 5 is a fragmentary view in elevation of the motor pulley shown in FIG. 4.
Figure 7:
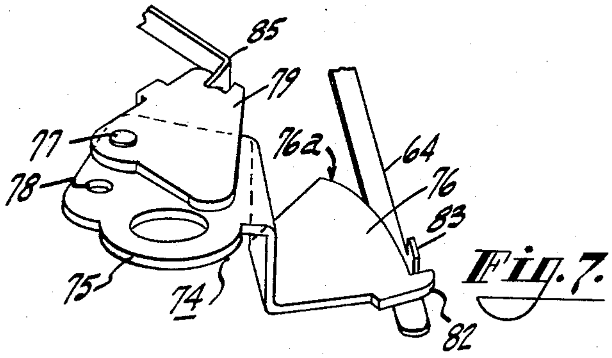
FIGURE 7 is an enlarged perspective view of the control mechanism shown in FIGS. 1 and 2, with parts removed.

The motor pulley 57 has a flat cylindrical belt driving surface. This surface has an annular groove of width less than the diameter of the belt. The belt is stretched around the pulley and extends slightly into the groove (see FIG. 5). The belt thus rides in the groove. The movement of the belt out of the groove results in a force on the belt which tends to bring the belt back into the groove. The belt cannot climb out of the groove onto flanges of the pulleys and therefore the effective diameter of the pulley is maintained constant. The speed of the belt, the capstan flywheel and the tape thus does not change. Thus, wow and flutter, such as caused by the movement of the belt in known belt drive systems is substantially eliminated.

A pair of idler rollers 59 and 60 is carried on opposite ends of an arm 61. The arm 61 is rotatably mounted around the shaft 29 of the take-up drive wheel 52 below the tape deck 10 and above the wheel 52. Pins 62 extend downwardly from the arm 61 and carry the idler rollers 59 and 60. The arm 61 is biased in a clockwise direction to the position shown in FIG. 1 by a spring 63 which is connected at one end to one of the pins 62 and at its other end to the bracket 35.

A bow-shaped control arm 64 is pivotally connected to the arm 61 at one of the pins 62. This arm 64 is movable in a direction towards the top of the drawing, as viewed in FIG. 1, by the control mechanism which will be described in detail hereinafter. When the arm 64 moves upwardly, the arm 61 is pivoted in a counter-clockwise direction about the axis of the shaft 29 to the position shown in phantom in FIG. 1. The idler roller 60 then stretches the belt 58 to disengage the belt from the take-up wheel 52. The other idler roller 59 also stretches the belt to engage the belt 58 with the supply wheel 53. The supply wheel 53 is then driven in a clockwise direction to effect rewinding of the tape at high speeds.

It will be noted that the belt 58 is disposed around the take-up wheel 52. This arrangement makes it possible to engage and disengage the belt 58 by a single pivotal movement of a single arm 61. Both take-up and fast rewinding operations will therefore be accomplished with a single, compliant belt. The need for a plurality of belts and/or shiftable drive coupling rollers is dispensed with through the use of drive mechanism which is provided in accordance with one feature of this invention.

The control mechanism for the recorder is actuable by a single control knob 70 shown in phantom in FIG. 2. The knob 70 is secured to a control shaft 71 which is journaled for rotation in the tape deck 10 and is supported on the tape deck 10 by means of a bracket 72. The bracket 72 is shown broken away in FIG. 1 to illustrate other parts of the control mechanism. The bracket 72 carries a spring wire 73 which bears against a flat on the control shaft 71 and holds the shaft normally in its central position as viewed in FIG. 1. The shaft may be rotated about 90° in a clockwise or in a counterclockwise direction to condition the apparatus for slow speed drive or for fast rewinding, respectively.

A cam plate 74 is rotatable with the shaft 71. This cam plate 74 has an upper step 75 and a lower step 76. The lower step 76 has a cam surface **76*a*. The upper step 75 has a pair of pivots 77 and 78. A toggle plate 79 is secured to the upper step 75 of the cam plate 74 at the pivot 77. This toggle plate 79 is biased in a clockwise direction by a spring 80 which is connected at one end to the vertical wall 81 of the cam plate 74 and at its other end to a downwardly extending projection on the toggle plate 79**.

The lower step 76 of the cam plate 74 has a stop 82 formed at the bottom of the cam surface thereof. This stop 82 acts upon an upwardly extending projection 83 on the control arm 64. The control arm 64 is biased against the cam surface of the lower step 76 by a spring 84. This spring 84 is connected at one end to the projection 83 and at its other end to the vertical wall 81 of the cam plate.

When the shaft 71 is turned by the control knob 70 in a counter-clockwise direction, the stop 82 engages the projection 83 and shifts the bow-shaped control arm 64 to the position shown in phantom in FIG. 1. The control arm 64 and the lower step 76 of the cam plate 74 provide a detent mechanism for maintaining the reeling device drive mechanism in the position shown in phantom in FIG. 1. The arm 64 and the lower step 76 of the cam plate 74 are shaped so as to form a toggle joint. When the cam plate 74 is rotated in a counter-clockwise direction approximately 90° from the position shown in FIG. 1, the toggle joint formed by the arm 64 and lower step 76 at their contacting projection 83 and stop 82, respectively, moves past its dead center position. When the arm 64 is moved upwardly (FIG. 1), it overcomes the bias of the spring 63 which is coupled thereto through a pin 62 (FIG. 2). Once the toggle joint moves past dead center position, the bias of the spring 63 maintains the joint past dead center position. Accordingly, the belt 58 will be maintained out of engagement with the wheel 52 and in engagement with the wheel 53 until the toggle joint is tripped.

As was mentioned above, the supply hub, which is coupled to the supply drive wheel 53, is rotated at high speed when the belt 58 engages the supply drive wheel 53. Therefore, fast rewinding is accommplished by turning the control 70 in a counter-clockwise direction.

The toggle joint can be reset by manually turning the control knob 70 in a clockwise direction so as to overcome the bias of the spring 63. Another mechanism, responsive to the tension in the tape, is provided for automatically tripping the toggle joint before the end of the tape is unwound from the supply hub. This tape tension responsive mechanism will be described hereinafter.

The toggle plate 79 has a notch therein. A tongue 85 extending from the pressure roller 44 arm has a V-shaped notch therein (FIG. 2). The tongue 85 and the toggle plate 79 interlock with each other at the notches therein. The toggle plate 79 and the pressure roller arm 44 provide a detent mechanism for maintaining the slow speed reeling mechanism of the tape transport in tape driving relationship. When the control shaft 71 is turned in a clockwise direction, the toggle plate 79 pivots about its pivot 77, thereby overcoming the bias of the spring 80. The rotation of the toggle plate 79 is limited by the tongue 85 and is translated into pivotal movement of the arm 44 in a counter-clockwise direction about its pivot 45. The pressure roller is therefore advanced in an upward direction, as viewed in FIG. 1, and into engagement with the capstan 34.

A toggle joint is defined between the upper step 75 of the cam plate 74 and the toggle plate 79 at the pivot 77. When the shaft 71 is rotated in a clockwise direction, this toggle joint moves from left to right, as viewed in FIG. 1, past its dead center position and is maintained past its dead center position by the bias of the spring 80. The pressure roller 34 is therefore maintained in contact with the capstan 33. The position of the bow-shaped control arm 64 does not change when the control is rotated in a clockwise direction since the projection 83 will slide on the cam surface of the lower step 76. Accordingly, the take-up drive wheel 52 and the take-up hub will be driven to take up the tape, and the capstan and pressure roller will be effective to drive the tape from left to right, as viewed in FIG. 1. Thus, signals may be recorded or reproduced when the control is rotated in a clockwise direction.

The detent mechanism provided between the toggle plate 79 and the cam plate 74 may be tripped by rotating the control shaft 71 in a counter-clockwise direction. The mechanism will then return to the position shown in FIG. 1. Alternatively, the toggle joint may be tripped by action of the mechanism which is responsive to the tension in the tape.

The tape tension responsive mechanism includes two tape tension sensing pins 90 and 91. The pin 91 projects from a bow-shaped lever arm 92 which is pivotally mounted on the tape deck 10 at a pivot 93. One end of this lever is bent downwardly and carries a brake pad 94. When the mechanism is in the neutral or idle position shown in FIG. 1, the pad 94 can engage the supply wheel 53 in braking relationship. The lever 92 also operates an electrical switch 95. This electrical switch 95 is wired to a plug 96 which is connected through the switch 95 to the motor 54. The plug 96 can be connected to an outlet socket for supplying power to energize the motor 54. The motor is de-energized when the mechanism is in the neutral or idle position, as shown in FIG. 1. When the lever 92 rotates in a counter-clockwise direction about its pivot 93, the switch 95 is actuated and the motor 54 is energized. It will be noted that the lever 92 performs the triple function of being part of a brake mechanism, a motor control mechanism and a tape tension responsive mechanism.

A link 97 couples the lever 92 and the cam plate 74. This link is pivotally connected to the cam plate 74 at the pivot 78. The tension sensing pin 90 is carried on another bow-shaped lever 98. This lever 98 is coupled to the lever 92 by a rod 99. The tape tension sensing pins 90 and 91 will be set in position for sensing the tension in the tape when the control 70 is rotated either in a clockwise direction for recording or playback or in a counter-clockwise direction for rewinding. In either case, the link 97 shifts to the right, as viewed in FIG. 1, and rotates the lever 92 in a counter-clockwise direction about its pivot 93. The motion of the lever 92 is transferred to the lever 98 by the rod 99. The lever 98 is therefore pivoted in a clockwise direction so that the tension sensing pin 90 is also set in position. The tension sensing pins are retained in position by the detent mechanisms associated with the control 70.

A spring 100 is connected at one end to the tape deck 10 and at its other end to the lever 92 for biasing the lever in a clockwise direction so that the brake 94 is normally applied and the motor 54 is de-energized.

During a recording or playback, immediately before the end of the tape is unwound from the supply hub, the tension in the tape increases. Sufficient force is exerted on the pin 91 to trip the toggle joint defined by the toggle plate 79 and the cam plate 74. The force applied to the pin 91 by the tape rotates the lever 92 in a clockwise direction. This clockwise rotation is transferred to the cam plate 74 through the link 99. Sufficient torque is transferred from the lever 92 to the cam plate 74 to move the toggle joint formed by the toggle plate 79 and the upper step 75 of the cam plate 74 back past its dead center position. This trips the toggle joint. The lever 92 then rotates in a clockwise direction so that the brake 94 is applied to the wheel 53 and the switch 95 is opened to deenergize the motor 54. Reeling operation therefore stops.

During rewinding, the pin 90 senses the tension in the tape. Before the tape is completely unwound from the take-up hub, sufficient force will be applied to the pin 90 to rotate the lever 98 in a counter-clockwise direction, thereby tripping the toggle joint provided by the lower step 76 of the cam plate 74 and the lever 64. The force applied to the pin 90 is transferred through the rod 99, the lever 92 and the link 97 to rotate the cam plate 74 in a clockwise direction. Sufficient torque is applied to the cam plate 74 to move the toggle joint formed by the arm 64 and the lower step 76 of the cam plate 74 past its dead center position, thereby tripping this toggle joint. When the latter toggle joint is tripped, the brake 94 is applied to the supply hub drive wheel 53 and the motor 54 is de-energized, as previously described.

A mechanism which interlocks the record-playback switch includes an arm 110 which is secured to the control shaft 14 and rotates therewith. It will be remembered that the record-playback switch is spring biased in a counter-clockwise direction to the position shown in FIG. 1. In the position shown, the record-playback switch conditions the amplifier associated therewith for playback. The switch must be rotated against its bias in a clockwise direction to condition the amplifier for recording. An arm 111 is pivotally mounted below the tape deck 10. A hair pin spring 112 is connected between the arm 111 and the tape deck and biases the arm in a clockwise direction as viewed in FIG. 1. Accordingly, when the record-playback switch control arm is rotated in a clockwise direction, the end thereof latches with the end of the arm 111. When the control 14 is released, the record-playback switch remains in record position.

It is desirable that the record-playback switch be returned to playback position each time recording is stopped so as to prevent inadvertent erasure which is possible when reeling is resumed with the record-playback switch in record position. Such inadvertent erasure is precluded in accordance with another feature of the invention. Each time the link 97 moves from right to left, the arm 111 is engaged by a projection 113 which extends from the link 97. It will be recalled that the link 97 is in the tension responsive mechanism and is linked to the cam plate 74. Thus, the link 97 will move from right to left each time the control 70 is returned either manually or automatically to the idle (stop) position. When the link 97 moves from right to left (FIG. 1), the arm 111 pivots in a counter-clockwise direction and releases the switch control arm 110 so that the switch may rotate in a counter-clockwise direction back to playback position.

It is also desirable to prevent erasure of the tape by making it impossible to rotate the control 14 to the record position if a cartridge carrying a pre-recorded tape record is placed on the machine. Cartridges having a pre-recorded tape record have a rear wall opening therein. A rod 114 is provided for sensing whether a cartridge has or does not have an opening therein and thus determining whether it carries a pre-recorded tape record. This rod is pivotally mounted on the tape deck 10 by means of a bracket 115. The rod 114 is bent so as to define a crank. This rod is connected to an arm 116 which is pivotally mounted on the tape deck near the switch control arm 110. When a cartridge having an opening therein is placed on the tape deck, the rod 114 is received in this opening (the end **114*a* extends into the opening) and retains the position shown in FIG. 1. The arm 116 then is maintained in a position to block rotation of the switch control arm 110. The record-playback switch therefore cannot be turned to record position. When a cartridge without an opening is placed on the tape deck, the end 114*a* of the rod 114 is pushed back (i.e., upwardly in FIG. 1) and the rod, acting as a crank, rotates the arm 116 in a clockwise direction and permits rotation of the switch control arm 110**. Accordingly, recording, as well as playback, can be performed on the tape carried in a cartridge which does not have an opening therein. This opening is usually provided by a knock-out which can be removed from the cartridge.

Another embodiment of a drive mechanism provided in accordance with the present invention is shown in FIG. 3. This drive mechanism, similarly to the drive mechanism shown in FIGS 1 and 2, includes a take-up wheel 52 and a supply wheel 53. A compliant belt 58 extends around a multi-step motor pulley 120 and the capstan flywheel 40. The belt 58 encompasses the take-up wheel 52 and normally engages the take-up wheel 52 at a position thereon where the wheel 52 faces the wheel 53. An arm 121 is rotatable on the shaft 29 of the wheel 52 and carries a single idler roller 122 on one end thereof. The opposite end of the arm 121 is pivotally linked to the control arm 64. In order to condition the recorder for rewinding operation, the arm 64 is moved in an upward direction, as viewed in FIG. 3 by a control mechanism similar to the control mechanism described in connection with FIG. 1. This shifts the arm 121 counter-clockwise. When thus shifted, the arm 121 and the roller 122 assume the position shown in phantom in FIG. 3. The belt 58 is then stretched and pinched against the periphery of the wheel 53. It will be observed that the illustrated drive mechanism requires one less idler roller since the same idler roller 122 disengages the belt 58 from the wheel 52 and engages the belt 58 with the other wheel 53. Another advantage of the embodiment of the invention illustrated in FIG. 3 is smooth running of the take-up wheel 52. It will be recalled that the motor 54 rotates in a counter-clockwise direction, as viewed in FIG. 3. The belt 58 is, therefore, longitudinally stretched slightly in the portion thereof which passes from the capstan flywheel 40 to the motor pulley 120. The amount of stretch will be variable if the load on the motor varies. Thus, the speed of the take-up wheel may vary slightly. The belt is not appreciably stretched in the portion thereof which passes from the motor pulley 120 to the flywheel 40 since the driven element (the flywheel 40) does not exert appreciable torque to stretch the belt and also since there is little variation in the speed of rotation of the flywheel because of its high inertia.

The speed change mechanism provided by the invention is illustrated in FIGS. 3 and 4. This speed change mechanism operates by shifting the belt 58 between the different diameter steps of the motor pulley 120. This shift is accomplished by a crank 125 which is pivotally mounted on the deck 10 in a bracket 126. An upstanding end of this crank is held in neutral position, in which the crank does not contact the belt 58, by means of a spring plate 127. This spring plate 127 has a V-shaped notch therein in which the vertical end of the crank 125 is confined. The end of the crank 125 which is adapted to contact the belt 58 is hooked under and through the belt loop. Accordingly, when the crank is tilted in a clockwise direction, as viewed in FIG. 4, the under side of the belt is contacted by the hooked end of the crank. Conversely, when the crank 125 is rotated in the counter-clockwise direction, the upper side of the belt 58 is contacted by the hooked end of the crank 125.

To decrease the speed of the tape, the belt is shifted from the small diameter portion of the motor pulley to the larger diameter thereof. It will be remembered that the belt is moving from left to right, as viewed in FIG. 4. When the under side of the belt is contacted by the hooked end, a force component in a generally upward direction is applied to the belt at a point adjacent to the motor pulley. A composite force in a generally upward direction due to (1) the force from left to right which is applied by the motor pulley and (2) the upwardly directed force due to the hook, causes the resilient belt to roll upwardly around the under side of the larger diameter portion of the motor pulley and onto the larger diameter portion thereof.

When it is desired to increase the speed of the tape, the crank 125 is pivoted so that the hooked end thereof contacts the upper side of the belt 58. This causes the belt to rotate in a clockwise direction about its own axis and shift downwardly to the reduced diameter potion of the motor pulley. The precise point of contact of the crank 125 with the under side and upper side of the belt which causes the belt to shift depends upon the size of the belt and the size of the motor pulley. For a relatively small belt and motor pulley, points of contact close to the motor pulley and along a line parallel to the axis of the motor pulley have been found suitable. In any event, the O-ring belt can be shifted easily from one pulley diameter to the other by reason of the circular cross-section of the belt which enables the belt to roll as it is shifted.

The shape of the motor pulley facilitates the shifting of the belt. The motor pulley is shown in detail in FIG. 5. It will be observed that the smaller diameter groove 144 of the pulley 120 is separated from the larger diameter groove 145 thereof by a flange 128. This flange has a slight inclination with respect to a plane perpendicular to the axis of the motor pulley, as represented by the angle $\alpha$. This inclination is shown in the drawing, purely for the purpose of illustration, as being about 7°. The cross sectional shape of the O-ring belt 58 is also shown in the drawing. The groove 66 in the base of each of the main grooves 144 and 145 forms an auxiliary groove therein. It will be observed that the belt rides in the groove 66 of the respective main grooves.

Figure 6:
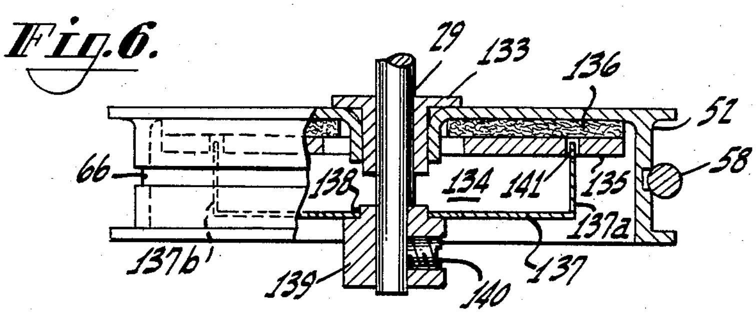
FIGURE 6 is a fragmentary, sectional view of a clutch mechanism incorporated in the tape transport mechanism illustrated in FIGS. 1 and 2.

The clutch mechanism is shown in FIG. 6. A feature of this clutch mechanism is its simplicity of construction. The take-up wheel 52 is attached to a bearing 133 which is freely rotatable about the shaft 29. The wheel 52 may be flanged and has a groove 66 for the purpose of guiding the belt 58 which drives the wheel 52. A clutch mechanism 134 in accordance with the present invention couples the shaft 29 to the wheel 52. A metal disc 135 and a disc 136 of frictional material, such as felt, provide the clutch plate. These discs have center holes therein. The diameter of the hole in the metal disc 135 is greater than the diameter of the hole in the felt disc 136. The metal disc is biased against the web of the wheel 52 by a flat, leaf-type, spring 137 formed into U-shape. This spring 137 has an opening 138 therein. A boss 139 is attached to the shaft 29 by means of a set screw 140. The shaft may be flattened to facilitate securing the set screw in place. The upper portion of the boss is stepped and enters the hole in the spring 137. The spring 137 has opposed arms **137*a* and 137*b*, the upper ends of which bear against the under surface of the metal disc 135 to press it against the felt disc 136. Tips 141, extending up from the upper ends of the spring arms 137*a* and 137*b* enter into holes in the disc 135 so that the disc 135 does not rotate with respect to the spring 137. The amount of friction coupling between the wheel 52 and the shaft 29 may be adjusted by adjusting the position of the boss 139 on the shaft 29. When the boss is moved upwardly along the shaft, the spring force may be increased. The proper position of the boss 139** may be determined by trial so that slippage may occur without exerting excessive tension on the tape such as would cause the tape to break.

From the foregoing description, it will be apparent that there has been provided an improved tape transport mechanism having the features of simplicity of construction and operation, especially since many parts, such as a single drive belt and control mechanism are arranged to serve a plurality of functions. An improved speed change mechanism and clutch mechanism are also provided in accordance with the invention. Variations in the illustrated mechanisms will, of course, be apparent to one skilled in the art. Accordingly, the foregoing description should be taken as being illustrative and not in any limiting sense.

What is claimed is:

1. Reeling apparatus which comprises a pair of reeling devices, a pair of shafts therefor, a resilient belt having a portion thereof in driving engagement with one of said reeling devices, and control means for stretching said belt to disengage said belt from said one reeling device and engaging said belt with the other of said reeling devices.

2. Reeling apparatus which comprises a pair of reeling devices, a belt of resilient material, one of said reeling devices being disposed within the confines of said belt and in engagement therewith, and means for stretching said belt to disengage it from said one reeling device and engaging said belt with the other of said reeling devices.

3. Apparatus for reeling a medium between a pair of reeling devices which comprises a rotatable drive member, a rotatable driven member, a belt of resilient material coupling said drive member and said driven member, said belt being disposed in contact with one of said reeling devices in a portion thereof which extends between said drive member and said driven member, and means for stretching said belt to disengage said belt from the one of said reeling devices with which it is in contact and engaging said belt with the other of said reeling devices.

4. Apparatus for reeling a tape between a pair of reeling devices which comprises a drive pulley, a driven pulley, a resilient belt trained around said drive pulley and said driven pulley, one of said reeling devices being disposed within the confines of said belt, a portion of said belt extending between said drive pulley and said driven pulley being stretched along said one reeling device, a rotatable member for stretching said belt and disengaging it from said one said reeling device and engaging the belt with said other reeling device.

5. Apparatus for reeling a record tape between a pair of reeling devices which comprises a drive pulley, a driven pulley, a resilient belt trained around said pulleys, one of said reeling devices being encompassed by said belt, one side of said belt being stretched along said one reeling device, and means for stretching said one side of said belt and disengaging said belt from said one reeling device and simultaneously stretching the other side of said belt and engaging said other side of said belt with the other of said reeling devices.

6. Tape transport apparatus which comprises a pair of reeling devices spaced from each other, a drive pulley, a driven pulley, a resilient belt disposed around said drive pulley and said driven pulley and encompassing one of said reeling devices, one side of said belt being disposed between said reeling devices, the opposite side of said belt being stretched along a portion of one of said reeling devices, an arm, a pair of idler rollers, said idler rollers being movable in opposite directions each into engagement with an opposite side of said belt for stretching said sides and disengaging said one side from said one reeling device and engaging said other side with the other of said pair of reeling devices.

7. Apparatus for reeling a record between a pair of reeling devices which are spaced from each other, said apparatus comprising a belt encompassing one of said reeling devices, one side of said belt extending between said reeling devices and being stretched along said one reeling device, and means for shifting said one side of said belt out of engagement with said one reeling device and into engagement with the other of said reeling devices.

8. Apparatus for reeling a record between a pair of reeling devices which are spaced from each other, said apparatus comprising a belt encompassing one of said reeling devices, one side of said belt extending between said reeling devices and being stretched along said one reeling device, and means for stretching said belt in a direction to disengage said belt from said one reeling device and engaging said belt with said other reeling device.

9. Apparatus for reeling a record tape between a pair of reeling devices which are spaced from each other, said apparatus comprising a drive pulley, a driven pulley, a resilient belt entrained around said pulleys, one side of said belt extending between said reeling devices, a pivotally mounted arm, an idler roller carried on said arm, and means for pivoting said arm so that said roller engages said belt between said reeling devices and stretches said belt out of engagement with one reeling device and into engagement with said other reeling device.

10. In a tape transport mechanism having reel drive means for feeding a tape at high speed and capstan and pressure roller means positionable into engagement with each other for feeding the tape at low speed, a control mechanism which comprises a first detent mechanism movable to and from set and tripped positions for positioning said capstan and pressure roller means into and out of engagement with each other, a second detent movable to and from set and tripped positions for positions for operating said high speed feeding means, and a control member common to said first and said second detent mechanisms for setting either one of said first and second detent mechanisms without setting the other.

11. In a tape transport mechanism having slow speed reeling means movable into and out of operating positions and high speed reeling means movable into and out of operating positions, a control mechanism which comprises a first control arm for moving said slow speed reeling means into operating position, a second control arm for moving said high speed reeling means into operating position, a control member common to said first control arm and said second control arm, means coupling said first control arm and said control member for providing a first detent mechanism, and means coupling said second control arm and said control member for providing a second detent mechanism.

12. In a tape transport mechanism including drive means for driving a record tape in opposite directions, a control mechanism comprising a first arm movable into operating position for conditioning said drive means to drive said tape in one direction and a second arm movable into operating position for conditioning said drive means to drive said tape in the opposite direction, a rotatable control member coupled to each of said arms to provide separate toggle joints therewith, and means for alternatively moving said control member in one direction to shift one of said toggle joints past its dead center and set said one toggle joint and moving said control member in the opposite direction to shift the other of said toggle joints past its dead center position and set said other toggle joint.

13. The invention as set forth in claim 12 characterized by the addition of tape tension responsive means for rotating said control member to shift said toggle joints past dead center position and trip said toggle joints.

14. In a tape transport apparatus having means for reeling a record tape at high speed and means for reeling a record tape at low speed, a control mechanism which comprises a first control arm associated with said slow speed reeling means, a second control arm associated with high speed reeling means, a rotatable control member, and a toggle member pivotally mounted on said control member and coupling said control member to one of said first and said second arms and forming a first toggle joint, said control member having a portion coupled to the other of said first and second control members for forming a second toggle joint.

15. In tape recording and reproducing apparatus having a record-reproduce switch normally biased into reproduce position and movable into record position, a latch arm on said switch, a lever pivotally mounted adjacent said latch arm for latching said arm when said switch is moved into record position, a control member, an operating control for said apparatus coupled to said control member and movable from one to the other of two positions to condition said apparatus to either drive a tape or to stop tape drive operation, and means coupling said control member to said latch arm for pivoting said latch arm in a direction to release said latch arm when said operating control moves from drive position to stop position.

16. A tape transport mechanism which comprises, in combination, a drive shaft, a capstan, a belt coupling said drive shaft and capstan in driving relationship, a pair of reeling device drive shafts, one of said reeling device drive shafts being in frictional driving engagement with said belt, a pressure roller movable toward and away from said capstan, and a manually actuable control mechanism having a plurality of operating positions and including a first detent for moving said pressure roller toward said capstan and retaining said pressure roller in contact with said capstan when said control mechanism is disposed in one of its said operating positions and also including a second detent for disengaging said belt from said one of said pair of reeling device drive shafts and engaging said belt with the other of said pair of reeling device drive shafts and retaining said belt in engagement with said other reeling device drive shaft when said control mechanism is disposed in another of its said operating positions.

17. A tape transport mechanism which comprises a pair of reeling devices between which the tape is adapted to travel, a capstan for driving the tape between one of said pair of reeling devices which supplies the tape and the other of said reeling devices which takes-up the tape, a resilient drive belt extending around said capstan and passing along said take-up reeling device in yieldable engagement therewith, means for stretching said belt out of engagement with said take-up reeling device and engaging said belt with said supply reeling device, a pressure roller movable into and out of engagement with said capstan, a control mechanism including a first arm movable into operating position for stretching said belt out of engagement with said take-up reeling device and engaging said belt with said supply reeling device to rewind the tape, said control mechanism also including a second arm movable into operating position for moving said pressure roller into engagement with said capstan to drive said tape, and a control member coupled to each of said arms and providing separate detent mechanisms therewith, said control member being manually actuable in opposite directions to set one or the other of said detent mechanisms and to move said first arm and said second arm alternately into their respective operating positions.

18. Apparatus for handling a magnetic record tape which comprises a pair of rotatable tape reeling devices, the tape being reelable along a path between said devices, a capstan and pressure roller disposed on opposite sides of said path and being movable toward each other to engage the tape therebetween and away from ech other to release the tape, electrically energizable drive means for rotating said capstan and one of said reeling devices, means disposed along said path for sensing the tension in the tape reeled along said path, a switch for controlling energization of said drive means, a braking element, a first and a second detent mechanism movable between set and reset positions, said first detent mechanism being operative when moved into set position for moving said pressure roller and capstan toward each other to engage the tape therebetween, said second detent mechanism including means operative when moved into set position for disengaging said drive means from said one reeling device and engaging said drive means with said other reeling device, a movable member for actuating said switch having said tension sensing means and said braking element mounted thereon, and a single rotatable control member for setting and resetting said detent mechanisms, said movable member being coupled to said control member for movement therewith to release said braking element and to actuate said switch to energize said drive means when said control member is operated to set either of said detent mechanisms and for rotating said control member in response to tension in the tape to reset said detent mechanisms.

19. Winding and reeling apparatus for transporting a flexible tape from a storage reel to a take-up reel, said apparatus comprising: a transport mechanism, including a capstan having an axis of rotation, for moving said tape between said reels; a pressure roller, likewise having an axis of rotation, maintained in a rest position adjacent said capstan during quiescent intervals but movable to an operating position to effect transport of said tape by said capstan; means for placing said axis of said roller in a plane parallel to said axis of said capstan to establish a coplanar relation of their axes; and self-aligning means for displacing said axis of said roller in the plane of said axis of said capstan to establish a parallel relation of said axes in their common plane when said roller is in its aforesaid operating position.

20. Winding and reeling apparatus for transporting a flexible tape from a storage reel to a take-up reel, said apparatus comprising: a transport mechanism, including a capstan having an axis of rotation, for moving said tape between said reels; a pressure roller, likewise having an axis of rotation maintained in a rest position adjacent said capstan during quiescent intervals but movable to an operating position to effect transport of said tape by said capstan; mounting means for supporting said roller; means for positioning of said mounting means to place said axis of said roller in a plane parallel to said axis of said capstan to establish a coplanar relation of their axes; and including a pivotal coupling between said means and said mounting means for automatically establishing said axis of said roller in the plane of said axis of said capstan to establish a parallel relation of said axes in their common plane when said roller is in its aforesaid operating position.

21. Winding and reeling apparatus for transporting a flexible tape from a storage reel to a take-up reel comprising:

a tape deck;

a transport mechanism for moving said tape between said reels, including a capstan having an axis of rotation, said capstan being mounted on said tape deck;

a pressure roller likewise having an axis of rotation;

a shaft passing through said axis of rotation of said roller;

a bracket connected to said shaft so that said pressure roller is free to rotate about its axis;

an arm, pivotally mounted on said tape deck for movement along said tape deck from a quiescent position to an operating position adjacent said capstan;

means for pivotally mounting said bracket to said arm for placing said axis of rotation of said roller in a plane parallel to said axis of rotation of said capstan to establish a coplanar relation of their axes so that the movement of said arm from said quiescent position to said operating position causes said roller to engage said capstan and a tape placed therebetween, wherein the engagement of said roller with said capstan pivots said bracket to align said axis of rotation of said roller parallel to said axis of rotation of said capstan when said arm is in said operating position.

References Cited by the Examiner

UNITED STATES PATENTS

| | | | |
|---|---|---|---|
| 1,651,254 | 11/1927 | Cnossen | 74—242 |
| 2,412,551 | 12/1946 | Pratt et al. | 242—55.12 X |
| 2,450,262 | 9/1948 | Winslow et al. | 74—220 |
| 2,471,969 | 5/1949 | Meyer | 74—229 |
| 2,472,513 | 6/1949 | Bergquist | 74—229 |
| 2,499,273 | 2/1950 | Leach | 74—242 |
| 2,718,361 | 9/1955 | Evraets. | |
| 2,813,686 | 11/1957 | Schroter | 242—55.12 |
| 2,958,475 | 11/1960 | Mandell | 242—55.12 |

FOREIGN PATENTS

| | | |
|---|---|---|
| 1,060,946 | 4/1954 | France. |
| 1,074,749 | 10/1954 | France. |
| 1,039,762 | 9/1958 | Germany. |
| 1,087,822 | 8/1960 | Germany. |

MERVIN STEIN, *Primary Examiner.*

JOSEPH D. STRIZAK, RAPHAEL M. LUPO, *Examiners.*